Patented Jan. 6, 1931

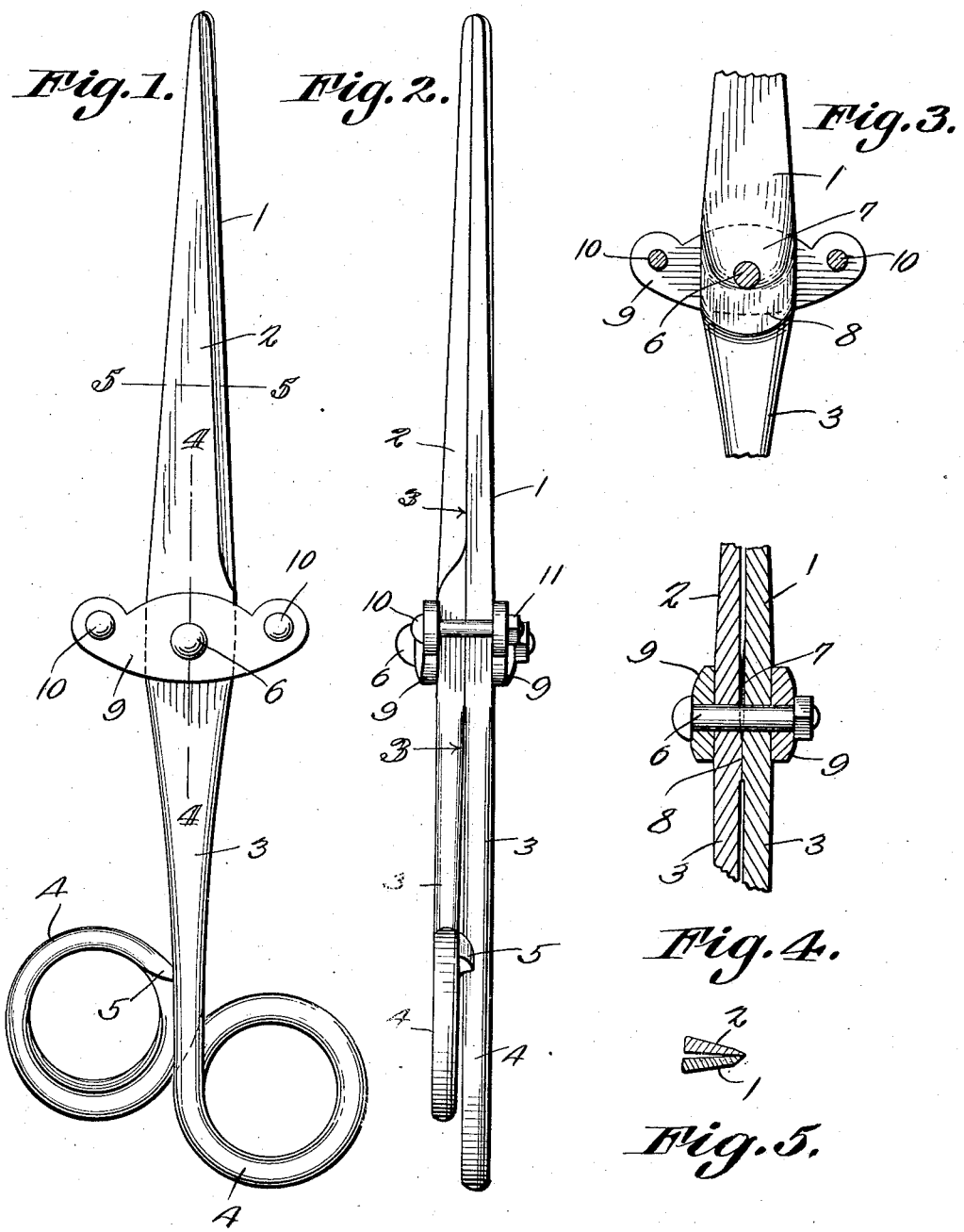

1,787,512

UNITED STATES PATENT OFFICE

THOMAS S. CRAMPTON, OF PIONEERVILLE, IDAHO

SCISSORS

Application filed June 29, 1928. Serial No. 289,220.

This invention relates to scissors, one of the objects being to improve upon the structure of devices of this type whereby the shearing action will be improved greatly, the cutting edges will be prevented from binding against the opposed blades at points back of the cutting edges, said cutting edges will be caused properly to cooperate throughout the length thereof, and wear upon the bearing portion and upon the blades can be compensated for readily.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings;

Figure 1 is a plan view.

Figure 2 is a side elevation.

Figure 3 is a section on line 3—3, Figure 2.

Figure 4 is a section on line 4—4, Figure 1.

Figure 5 is a section on line 5—5, Figure 1.

Referring to the figures by characters of reference 1 and 2 designate the respective blades of the scissors, each having a shank 3 extending therefrom. The free end of each shank merges into an eye 4 produced by coiling the end portion of the shank, the terminal of one of these coils being offset as shown at 5 to constitute a stop against which the opposed shank will abut when the scissors are closed.

The blades are connected by a pivot bolt 6 and the meeting faces of the blades are hollowed out or concaved as shown at 7, these concavities extending from the pivot portions of the blades a short distance toward the points of the blades. Close to the pivot 6 and at that side thereof nearest the eyes 4 there are provided bearing surfaces 8 adapted to contact one with the other, thereby to force the blades toward each other when they are moved from open to closed positions.

The two blades are slightly twisted transversely so that they contact solely at their edges. This eliminates any friction and wear such as generally produced where the cutting edges slidably engage the flat faces of the blades between the edges thereof. This will be obvious by referring to Figure 5.

The pivot bolt 6 is extended through the middle portions of clamping plates 9 which extend transversely of and beyond opposed portions of the blades and bear firmly against the outer faces thereof. The projecting end portions of these plates are connected adjustably by bolts 10 adapted to be tightened by means of nuts 11.

The scissors are to be used like ordinary ones but will be found superior thereto because, as a result of the twist imparted to the blades, said blades will only contact where their cutting edges cross. Consequently there will be no spacing apart of the cutting edges where engaging the material being operated on. By providing the concavities 7 it becomes possible, by tightening the bolts 10, to impart an increased lateral tilt to the blades and to compensate for wear upon the edges. The bearing faces 8 cooperate to insure proper pressure of the cutting edges against each other throughout the length thereof and more particularly adjacent the points of the blades. The movement of the blades relative to each other is of course limited by the abutment 5 cooperating with one of the shanks 3.

What is claimed is:

The combination of pivotally connected blades each provided with a longitudinal cutting edge, each blade having a transverse twist whereby the cutting edges are the only contacting parts of the blades remote from the pivot thereof, shanks terminating in eyes, bearing portions integral with and interposed between the blades and their shanks, said portions having straight, substantially parallel side portions, means on one of the eyes cooperating with one of the shanks for limiting the relative swinging movement of the blades in one direction, there being concavities in the inner faces of the bearing portions adjacent to the pivot and extended toward the cutting edges, cooperating projecting bearing surfaces on said bearing portions adjacent to the pivot and between the pivot and the shanks, means separate from and adapted to be bodily applied to or removed from the blades, for holding the blades together, said means including clamping plates extending transversely of the blades and mounted on the pivot, said plates firmly engaging the outer faces of the blades adjacent to the pivot and projecting laterally beyond the blades, and adjustable connections between the projecting ends of the plates, said plates bearing on the blades at points directly opposite the concavities and bearing faces.

In testimony that I claim the foregoing as my own, I have hereto affixed my signature.

THOMAS S. CRAMPTON.